United States Patent Office 3,088,315
Patented May 7, 1963

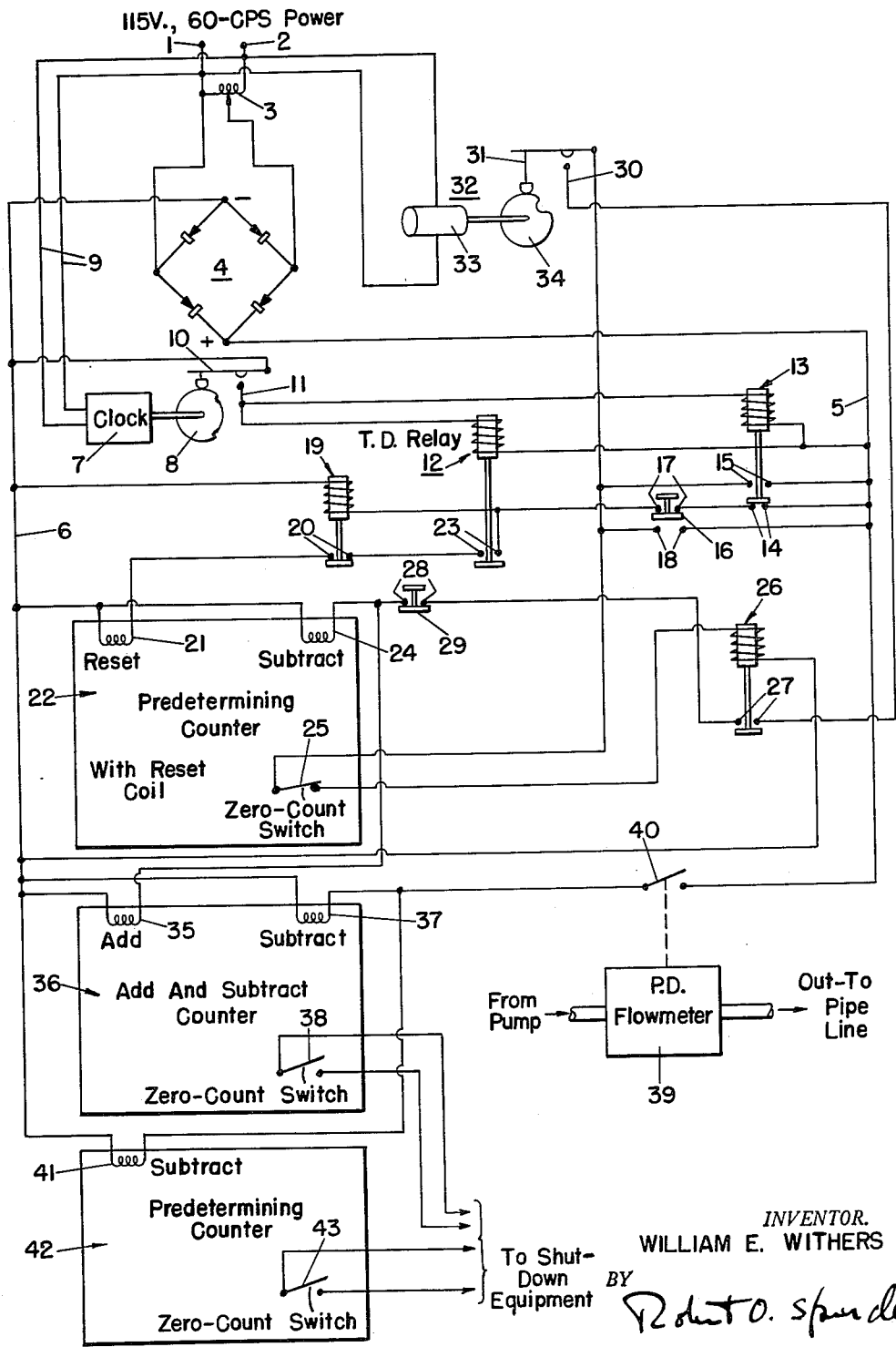

3,088,315
LIQUID TRANSFER METERING SYSTEM
William E. Withers, Beaumont, Tex., assignor to Sun Oil Company, Philadelphia, Pa., a corporation of New Jersey
Filed Dec. 9, 1959, Ser. No. 858,343
5 Claims. (Cl. 73—194)

This invention relates to a liquid transfer metering system, and more particularly to a system of this type which automatically prevents the transfer of any more than a predetermined quantity or volume of liquid during a given time interval.

The system of the invention is particularly applicable to Lease Automatic Custody Transfer (LACT) operations, wherein oil is automatically transferred from one or more producing oil wells (known as a "lease") to an oil pipe line system, for transportation to a desired point. However, the system may be used wherever any metered transfer of fluids is undertaken.

For the gathering of crude oil and for getting the same into an oil pipe line system, it is highly desirable to use an arrangement for automatically transferring the custody for oil from the producer (or lease holder) to the oil pipe line company; an arrangement of this type is commonly termed a Lease Automatic Custody Transfer system. It is common practice for the State regulatory agency to set a maximum on the daily production from each lease; this maximum is known as a "daily allowable" and is customarily expressed in barrels of oil per day. Any transfer (from the lease tanks to the pipe line) in excess of this daily allowable is known as "hot oil." Often, a maximum is set on the monthly production from a lease; this is known as a "monthly allowable."

Speaking generally, the system of this invention meters the liquid being transferred from the lease tanks, and automatically prevents the transfer of any liquid in excess of the allowable.

According to prior practice, in LACT systems the transfer of oil is controlled by reading the metering equipment after each transfer (the transferring generally being done in "batch" fashion), and then performing such calculations as are necessary to determine if more oil can be transferred without exceeding the allowable. This method of operation requires a delay in transfer, so as to be absolutely sure that the allowable is not exceeded.

The system of this invention, on the other hand, will allow the pumper to read directly (i.e., without any calculations) the number of barrels of liquid he is allowed to transfer at any time without exceeding his allowable; in this connection, it is pointed out that the allowable cannot be exceeded, due to automatic shut-down features incorporated in the invention. Also, with the system of the present invention, every barrel of the daily allowable can be automatically transferred on the day or hour that it is accumulated, if desired, provided of course that the liquid is available and that the transfer equipment is capable of handling this liquid.

In the past, some work has been done on a liquid transfer metering system which utilizes pneumatic principles and components or devices. However, such a system has not proven satisfactory, due to poor accuracy, and difficulties of calibration, regulation, and adjustment or change of setting.

In contrast, the system of the present invention, which utilizes electrical principles and components or devices, has an accuracy approaching 100 percent. In addition, no calibration or regulation is required, and adjustment or change of setting can be easily made by the pumper, without special tools.

A detailed description of the invention follows, taken in conjunction with the accompanying drawing, wherein the single FIGURE is a schematic circuit diagram of a system in accordance with the present invention.

Referring now to the drawing, a pair of terminals 1 and 2 serve as the power input terminals for the system; by way of example, these terminals are connected to a source of 115-volt alternating current power, as indicated by the legend. However, as will be brought out hereinafter, the system of this invention is not limited in use to locations where alternating current power is available; it can be powered from storage batteries (direct current power) rated at six volts or more. If powered by alternating current, the power line voltage is changed to a suitable value by means of an adjustable auto-transformer 3, and is then rectified (converted to direct current) by means of a full-wave bridge rectifier 4 of conventional type. The positive output terminal of rectifier 4 is connected to a positive power bus 5, and the negative output terminal of rectifier 4 is connected to a negative power bus 6. Of course, if the system were powered from a direct current source such as one or more storage batteries, the transformer 3 and the rectifier 4 would be eliminated and the buses 5 and 6 would be connected directly to the appropriate terminals of the direct current source.

The operation of the "daily allowable" portion of the system of this invention is governed by a clock 7 which rotates a cam 8 at the rate of one revolution per hour. Clock 7 is preferably a spring-operated clock which is electrically wound from the alternating current source by way of leads 9. If direct current were being used to power the system, the winding of the clock would of course be effected from the direct current power source. If the alternating current power source 1, 2 is sufficiently exact in frequency, an ordinary synchronous-motor type of clock could be used at 7. Cam 8 actuates a movable contact 10 which cooperates with a fixed contact 11, the cam being so designed as to close the single-pole, single-throw contacts 10, 11 for fifteen minutes of each hour, and to open these contacts for the remaining forty-five minutes of each hour (it will be recalled that cam 8 rotates at one revolution per hour; the contacts 10, 11 are shown as open in the drawing). Therefore, as will become apparent hereinafter, the "daily allowable" portion of the system of this invention is governed on a basis of hourly intervals.

Contact 10 is connected directly to negative bus 6, while contact 11 is connected to positive bus 5 by two parallel paths. One of these latter paths comprises the winding of a time delay relay 12, while the other comprises the winding of a relay 13. Thus, when contacts 10 and 11 are closed the windings of relays 12 and 13 are both energized, and these windings are both de-energized when contacts 10 and 11 are open.

Relay 13 carries a pair of normally-closed contacts 14 and a pair of normally-open contacts 15, contacts 14 and 15 being arranged as a single-pole, double-throw contact, as illustrated in the drawing. This means that when relay 13 is energized, contacts 14 first open, and subsequently contacts 15 close.

A spring-return pushbutton switch 16 has two "break" points 17 and two "make" points 18. The break points 17 are connected in series with the normally-closed relay contacts 14, while the make points 18 are connected in parallel with the normally-open relay contacts 15. Thus, it may be seen that operation of the pushbutton 16 will produce the same circuit action as does energization of relay 13. Pushbutton 16 is used for original adjustment of the system; it is thus not necessary to wait for the operation of relay 13 in order to make this adjustment. This pushbutton is not available to the operator during normal operation of the system, as it is located inside the control box (in which the various electrical units are housed), rather than in the face of the box. Pushbutton 16 is spring-biased to return to the position illustrated. Certain manual controls for the system are accessible to the operator during normal operation, as will be later described.

The winding of a relay 19 is connected in series with points 17 and relay contacts 14, across buses 6 and 5. Thus, relay 19 is energized when relay 13 is deenergized to close its contacts 14. Relay 19 carries a pair of normally-open contacts 20 which are closed when relay 19 is energized. Relay 19 is illustrated in its energized position (with its contacts 20 closed), since relay 13 is unenergized (with its contacts 14 closed) due to contacts 10 and 11 being open.

The "Reset" coil 21 of a predetermining counter 22 is connected in series with the contacts 20 and with the normally-open contacts 23 of relay 12 and with the points 17 and relay contacts 14, across buses 6 and 5. The counter 22 is a commercially-available steppable mechanical counter having a "Reset" coil 21, a "Subtract" coil 24, and a "Zero-count" switch 25. The counter 22 has odometer-type visual dials or preselection drums which can be manually set or actuated by hand to any predetermined or preselected four-digit number. When the system is in operation, the application of pulses to the "Subtract" coil 24 causes stepping of counter 22 (and its associated dials) in the subtractive or backward direction, each pulse so applied stepping this counter one unit or count, subtractively. When the count reaches zero, the switch 25 is mechanically opened; it is pointed out that this single-pole, single-throw switch is closed for all counts above zero. The "Reset" coil 21, when energized, causes counter 22 to reset to the value or count originally (manually) set therein. As previously stated, the counter 22 is commercially available; for example, it may be a "Sodeco Predetermining Counter," available through Landis and Gyr, 45 West 45th Street, New York city.

To recapitulate somewhat, when timer 7, 8 closes contacts 10, 11 (these contacts then remaining closed for fifteen minutes), relays 12 and 13 are energized. When contacts 14 open due to energization of relay 13, relay 19 is deenergized, and consequently contacts 20 open; this positively disconnects "Reset" coil 21 so that no resetting of counter 22 can occur while relay 13 is energized.

The winding of a relay 26 is connected in series with switch 25 and relay contacts 15, across buses 6 and 5. Thus, when contacts 15 close due to energization of relay 13, relay 26 is energized by way of switch 25. Relay 26 carries a pair of normally-open contacts 27, and is illustrated in the unenergized position.

The "Subtract" coil 24 of counter 22 is connected in series with the two "break" points 28 of a spring-return pushbutton switch 29, relay contacts 27, the fixed and movable contacts 30 and 31, respectively, of a pulser 32, and relay contacts 15, across buses 6 and 5. Pushbutton 28 is spring-biased to return to the position illustrated, and is necessary to ensure that the counter 22 is deenergized (by breaking the circuit to "Subtract" coil 24) while this counter is being manually set. The pulser 32 may comprise a motor 33 (energized from the alternating current source 1, 2) which rotates a cam 34 at a rate of about 3600 revolutions per hour (about one revolution per second). Cam 34 actuates movable contact 31 which cooperates with fixed contact 30, to open and close these contacts once during each revolution of the cam 34 and motor 33. The contacts 30 and 31 thus open and close at a rate of about 3600 times per hour, and these contacts operate continuously, as long as alternating current power is applied to the motor 33. Thus, when electrical current is connected to contacts 30 and 31, current pulses are produced at a rate of about one pulse per second, or about 3600 pulses per hour.

The pulser 32 is commercially available; for example, it may be a "Sodeco Pulser," available through Landis and Gyr in New York city. The speed of this pulser is not critical; consequently, a 12-volt direct current motor (energized from a battery) could be used for driving this pulser, if desired or if alternating current power is not available.

When relay 26 is energized, contacts 27 close and electric current is connected to the pulser contacts 30 and 31 through the following circuit: negative bus 6, "Subtract" coil 24, closed "break" points 28, contacts 27, contact 30; positive bus 5, contacts 15 (now closed), contact 31. Each time contacts 30 and 31 close, a current pulse passes through "Subtract" coil 24, energizing this coil and stepping counter 22 one unit in the subtractive direction. Then, after the counter 22 has reached zero due to the preset number of pulses (as preset by the count originally set manually into counter 22) being applied to "Subtract" coil 24, the switch 25 opens and stays open until counter 22 is electrically reset, in a manner to be described hereinafter. When counter 22 reaches zero as described, the opening of switch 25 deenergizes relay 26, opening its contacts 27 and thus disconnecting electric current from the pulser contacts 30, 31.

The "Add" coil 35 of an add and subtract counter 36 is connected electrically in parallel with "Subtract" coil 24, so that when the pulses are applied to this latter coil in counter 22, the same pulses are applied to "Add" coil 35 of the counter 36. The counter 36 is a commerically-available bidirectionally-steppable mechanical counter having an "Add" coil 35, a "Subtract" coil 37, and a "Zero-count" switch 38. The counter 36 has odometer-type visible dials, but is not adjustable other than having a manual reset, which for the purposes of the present system is made inoperative by a seal. The application of pulses to the "Add" coil 35 causes stepping of counter so (and its associated dials) in the additive or forward direction, each pulse to applied stepping the counter one unit or count, additively. The application of pulses to the "Subtract" coil 37 causes stepping of counter 36 (and its associated dials) in the substractive or backward direction, each pulse so applied stepping the counter one unit or count, subtractively. When the count reaches zero, the switch 38 is mechanically closed; it is pointed out that this single-pole, single-throw switch is open for all counts above zero. The application of the pulses to "Add" coil 35 (along with their application to "Subtract" coil 24) results in the preset count on the predetermining counter 22 being transferred to the add and subtract counter 36.

As previously stated, the counter 36 is commercially available; for example, it may be a "Sodeco Add and Subtract Counter," available through Landis and Gyr in New York city.

As previously described, the windings of relays 12 and 13 are connected in parallel, and each in series with contacts 10 and 11. Therefore, when relay 13 is energized (by closure of timed contacts 10 and 11), relay 12 is also energized. The time delay relay 12 has a two-second time delay in both the opening and closing operation. Therefore, two seconds after relay 12 is energized, contacts 23 close; these contacts remain closed until two seconds after the timed contacts 10, 11 open.

When timed contacts 10, 11 open (after having been closed for fifteen minutes, as described), relays 12 and 13 are deenergized. Therefore, contacts 14 close and contacts 15 open, almost instantaneously upon deenergization of relay 13. When contacts 14 close, relay 19 is energized, through these contacts and "break" points 17.

The energization of relay 19 closes its contacts 20, establishing a circuit as follows for the energization of "Reset" coil 21: bus 5, contacts 14, "break" points 17, contacts 23 (still closed because of the time delay afforded by relay 12), contacts 20, "Reset" coil 21, bus 6. When "Reset" coil 21 is energized momentarily, the original input setting on the predetermining counter 22 is again registered, and switch 25 closes. It may thus be seen that, during stepwise operation of counter 22, when this counter reaches zero the switch 25 opens, and it stays open for the remaining portion of the time that contacts 10, 11 are closed, plus about two seconds (the time delay of relay 12).

When contacts 10, 11 open (after having been closed), relay 13 is deenergized, opening its contacts 15 (which latter are in series with pulser contacts 30, 31). Therefore, no more pulses can be applied to the counter 22 until the timed contacts 10, 11 close at the beginning of the next hour.

The operation of the "daily allowable" portion of the system is started by the operator first inserting the hourly transfer allowable for the lease into the predetermining counter 22. By way of example, assume the lease has an allowable for transfer of 1,488 barrels per day. To determine the setting of the counter 22, the 1,488-barrel figure is divided by twenty-four (hours per day); thus, the allowable is 62 barrels per hour. This value (62 b.p.h.) is inserted in the predetermining counter 22 by opening the "preset" cover and actuating by hand the preselection drums to the desired number, "62," the push-button 29 being held down while this is being done. The number selected will appear on the dials or drums, so the operator can easily determine whether the proper number, "62," has been inserted. The cover is then closed, and the predetermining counter 22 is ready for operation.

At the beginning of each hour in the day (when contacts 10, 11 close), this number of counts (i.e., 62) will be registered in the add and subtract counter 36, regardless of whether or not any liquid transfer is then being made. This registration will take place periodically and repetitively once each hour, during the time interval (fifteen minutes) when contacts 10, 11 are closed; the registration will be effected due to the action of counter 22, pulser 32, counter 36, and the various relays, etc., as previously described.

The ease with which the predetermining counter 22 can be manually set is very desirable, inasmuch as the regulatory agency may change the lease daily allowable from time to time, due to the addition of new wells or to a cutback in the allowable of any one of the wells. If this change in daily allowable is ordered, a new hourly allowable would be calculated by the production personnel. This personnel would then advise the operator as to what daily allowable should be manually inserted into the predetermining counter 22.

A positive displacement type flowmeter 39 is connected to measure or monitor the flow of liquid being transferred, as for example by being inserted into the liquid flow pipe extending between the pump and the oil pipe line. This flowmeter mechanically actuates a contact 40 (illustrated as a single-pole, single-throw switch), at a rate of one closure of the switch or contact 40 for each unit volume (barrel) of liquid passing through the flowmeter. The contact 40 is connected in series with the "Subtract" coil 37 of counter 36, across buses 5 and 6. Thus, each time contact 40 closes, a current pulse is applied to "Subtract" coil 37, to step counter 36 one unit or count in a substractive direction or backwardly. Thus, at any time while liquid is being transferred (even while the input pulses from pulser 32, under the control of predetermining counter 22, are being registered via "Add" winding 35 on the add and subtract counter 36), pulses may be received from the flowmeter contact 40 located externally of the panel on which the remainder of the illustrated system is mounted.

Each pulse received by counter 36 from the flowmeter contact 40 indicates the passage of one barrel of liquid, and each such pulse is applied to the "Subtract" coil 37 of the add and subtract counter 36, thus removing or canceling out one of the add pulses applied to this counter (by stepping the counter subtractively, whereas the add pulses step the same additively), to give at all times an accurate and visible readout (by means of the visible dials of counter 36) of the permissible transfer in barrels of liquid (i.e., the unused allowable as of each instant). Thus, the system of this invention will permit the operator to read directly the quantity of oil in barrels that has accumulated as allowable but has not been transferred from the lease since the beginning of the month, assuming that the counter 36 is reset to zero at the beginning of the month (which would be the usual case).

The flowmeter 39 is commercially available; for example, it may be of a type manufactured by the O. A. Smith Manufacturing Company.

If the reading on the counter 36 ever reaches zero, the switch 38 is closed, as previously stated, thereby producing a liquid transfer shutdown signal. When this switch closes (at zero count on the dial), the shutdown signal produced is conveyed to remotely-located shutdown equipment, to complete a circuit (or open it, as required) to shut down the transfer of liquid. The actual shutdown is accomplished automatically by closing a valve and/or stopping the pumping equipment. Any number of operations can be accomplished as a result of the closing of switch 38. This shutdown is intended to be an automatic, and only occasionally attended, operation; it prevents the allowable transfer from ever being exceeded.

If the transfer operation is shut down by the system in the manner just described, it will remain shut down until the next hour's allowable is received by counter 36. When this next hour's allowable is received, stepping the counter 36 additively, the switch 38 is opened, removing the shutdown signal; liquid transfer may then start again.

The operation of the system of this invention indicates to the pumper when the well chokes are too large or too small. In particular, the automatic shutdown of the liquid transfer indicates too fast a rate of production from the wells, that is, the well chokes are then too large. On the other hand, if the transfer of liquid does not keep up with the readout dial on the add and subtract counter 36 due to the lack of sufficient liquid; this dial will accumulate the difference between the allowable and the transferred barrels. This indicates too slow a rate of production, that is, the well chokes are then too small.

As previously stated, various oil production states have different requirements, in so far as production allowables are concerned. Thus, monthly allowables may be set by the regulatory agency, instead of or in addition to daily allowables. To meet all of the various requirements in one metering system, the system of the invention may also have a "monthly allowable" portion, which latter will now be described.

The "Subtract" coil 41 of a predetermining counter 42 is connected directly in parallel with the "Subtract" coil 37 of counter 36, so that the same pulses that are received by this latter coil in the add and subtract "daily allowable" counter 36 (to wit, the pulses produced by the flowmeter contact 40) are also received by coil 41 in the "monthly allowable" counter 42. The counter 42 is somewhat similar to counter 22, but the former is a manual reset unit and does not have a reset coil. Counter 42 has a "Zero-count" switch 43. Counter 42 does have odometer-type visible dials which can be manually set to any desired five-digit number. The application of pulses to the "Subtract" coil 41 causes stepping of counter 42 (and its associated dials) in the subtractive or backward direction, each pulse so applied stepping this counter one unit or count, subtractively. When the count on counter 42 reaches zero, the switch 43 is mechanically closed; it is pointed out that this single-pole, single-throw switch is open for all counts above zero.

If the count or reading on counter 42 ever reaches zero, the switch 43 is closed, as just stated, thereby producing a liquid transfer shutdown signal. This latter signal is conveyed to remotely-located shutdown equipment, to shut down the transfer of liquid, in somewhat the same manner as previously described in connection with switch 38 of counter 36.

At the beginning of the month (first day of month), the total number of barrels of liquid that is allowed to be transferred during the month (the "monthly allowable") is preset on counter 42 by opening the cover and manually setting the dials to the desired number. The pumping equipment should be shut down for the few minutes that it takes to make this setting. After the setting is made on this counter, the pumping equipment is started up. Each time a barrel of liquid passes through the flowmeter 39, the flowmeter contact 40 sends a current pulse to the "Subtract" coil 41 in the "monthly" counter 42. When the number of pulses received by coil 41 from the flowmeter contact 40 equals the number that was preset on counter 42, switch 43 closes; this switch operation is used to electrically shut down the pumping equipment, as described previously.

Before the pumping equipment can be operated again, it is necessary for the operator to reset the "monthly allowable" counter 42. This is a manual reset, and can be sealed to prevent unauthorized or improper resetting.

The predetermining counter 42 is commercially available; for example, it may be a manual reset unit made by "Sodeco" or by Durant Manufacturing Company, 1929 North Buffum Street, Milwaukee, Wisconsin.

The invention claimed is:

1. In an automatic system for metering the transfer of liquid, a bidirectionally-steppable counter having an add winding and a subtract winding which when energized step said counter respectively in additive and subtractive directions; means for producing a series of current pulses at a fixed repetition rate, means operating periodically to apply a preselected number of said pulses to said add winding to energize the same, the number of pulses so applied being representative of the number of unit volumes of liquid desired to be transferred; and flow-responsive means actuated by the flow of liquid being transferred for energizing said subtract winding once for each unit volume of liquid transferred.

2. Combination as defined in claim 1, wherein the time interval between successive ones of said pulses, and the total time required for each application of the preselected number of pulses to said add winding, are both small as compared to the time interval between successive operations of the second-mentioned means.

3. Combination as defined in claim 1, wherein the second-mentioned means includes a counter operating to count the pulses applied to said add winding and to stop the application of pulses to said winding when said preselected number has been reached.

4. Combination in accordance with claim 1, including also means operated by said counter, in response to its reaching zero, for producing a transfer shutdown signal.

5. Combination as defined in claim 1, wherein the second-mentioned means includes a counter operating to count the pulses applied to said add winding and to stop the application of pulses to said winding when said preselected number has been reached; the combination including also means operated by said bidirectionally-steppable counter, in response to its reaching zero, for producing a transfer shutdown signal.

References Cited in the file of this patent

UNITED STATES PATENTS

| | | |
|---|---|---|
| 1,408,884 | Huebsch et al. | Mar. 7, 1922 |
| 2,089,724 | Wydler | Aug. 10, 1937 |
| 2,445,291 | Kamm et al. | July 13, 1948 |
| 2,577,115 | Eichner | Dec. 4, 1951 |

OTHER REFERENCES

An article entitled, "Factory-Build L.A.C.T. Unit Is Gas Operated" by Ralph W. Hill in the Oil and Gas Journal, (vol. 55, No. 18, May 6, 1957), pp. 98–102. (A copy is available in Division 36.)